US012469354B2

(12) United States Patent
Khatter et al.

(10) Patent No.: US 12,469,354 B2
(45) Date of Patent: Nov. 11, 2025

(54) SYSTEM AND METHOD FOR WIRELESS PRODUCT DISPENSATION FROM A SELF-SERVICE KIOSK

(71) Applicant: Vendekin Technologies Private Limited, Pune (IN)

(72) Inventors: Aroon Ashish Khatter, Pune (IN); Ajit Sukumaran Nair, Pune (IN)

(73) Assignee: VENDEKIN TECHNOLOGIES PRIVATE LIMITED, Pune (IN)

( * ) Notice: Subject to any disclaimer, the term of this patent is extended or adjusted under 35 U.S.C. 154(b) by 501 days.

(21) Appl. No.: 18/103,006

(22) Filed: Jan. 30, 2023

(65) Prior Publication Data
US 2023/0245518 A1    Aug. 3, 2023

(30) Foreign Application Priority Data

Jan. 31, 2022   (IN) .............................. 202221005259

(51) Int. Cl.
| | |
|---|---|
| G07F 9/02 | (2006.01) |
| G06Q 20/18 | (2012.01) |
| G06Q 20/20 | (2012.01) |
| G06Q 20/32 | (2012.01) |
| G07F 9/00 | (2006.01) |
| H04W 4/80 | (2018.01) |

(52) U.S. Cl.
CPC ............ *G07F 9/026* (2013.01); *G06Q 20/18* (2013.01); *G06Q 20/203* (2013.01); *G06Q 20/3276* (2013.01); *G07F 9/001* (2020.05); *H04W 4/80* (2018.02)

(58) Field of Classification Search
CPC .......... G07F 9/026; G07F 9/001; G07F 9/006; G07F 9/002; G06Q 20/18; G06Q 20/203; G06Q 20/3276; G06Q 20/322; G06Q 20/326; G06Q 20/327; G06Q 20/3278; H04W 4/80
See application file for complete search history.

(56) References Cited

U.S. PATENT DOCUMENTS

| | | | | |
|---|---|---|---|---|
| 9,666,013 | B2 * | 5/2017 | Want | G06Q 20/3224 |
| 10,602,334 | B2 * | 3/2020 | Kim | G06Q 20/3276 |
| 11,074,580 | B2 * | 7/2021 | Patel | G06Q 20/38 |
| 11,657,667 | B2 * | 5/2023 | Patel | G07F 11/72 |
| | | | | 700/231 |
| 11,663,875 | B2 * | 5/2023 | Patel | G07F 9/009 |
| | | | | 700/231 |

(Continued)

*Primary Examiner* — Michael Collins
(74) *Attorney, Agent, or Firm* — Jason A. Smith; Shumaker, Loop & Kendrick, LLP

(57) ABSTRACT

A system and method for enabling wireless dispensation of products from the self-service kiosk/vending machine without using an application associated with the self-service kiosk/vending machine. For this purpose, a machine-readable code, which is displayed on the self-service kiosk, is scanned by a portable user device. Further a short-range connection (e.g., BLE connection) is established between the portable user device and the self-service kiosk. This further enables sharing product inventory data to the portable electronic device. The inventory data is accessible through browser application of the portable electronic device. After selection of desired products by a user and making successful payment, the selected products are dispensed from the self-service kiosk.

14 Claims, 4 Drawing Sheets

(56) References Cited

U.S. PATENT DOCUMENTS

| | | | |
|---|---|---|---|
| 11,966,895 B2* | 4/2024 | Patel | G06Q 20/407 |
| 12,056,993 B2* | 8/2024 | Patel | G06Q 30/0609 |
| 2018/0288594 A1 | 10/2018 | Kim | |
| 2022/0012975 A1* | 1/2022 | Shturma | G06Q 20/3276 |

* cited by examiner

SYSTEM AND METHOD FOR WIRELESS PRODUCT DISPENSATION FROM A SELF-SERVICE KIOSK

CROSS-REFERENCE TO RELATED APPLICATIONS AND PRIORITY

The present application claims priority from an Indian patent Application No: 202221005259, filed on 31 Jan. 2022, incorporated herein by a reference.

TECHNICAL FIELD

The present subject matter described herein, in general, relates to a system and a method for wireless product dispensation from a self-service kiosk/vending machine. More particularly, the present invention relates to wireless dispensation of products from the self-service kiosk/vending machine without using an application associated with the self-service kiosk/vending machine.

BACKGROUND

The subject matter discussed in the background section should not be assumed to be prior art merely because of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

Self-service kiosks (vending machines) generally enable the user(s) to select product(s), pay the amount, and receive the selected product(s) dispensed by the self-service kiosk (hereinafter, interchangeably, vending machine). Some vending machines also have the provision to insert the appropriate amount of money into the vending machine and to select product(s), after which the selected product(s) is dispensed to the user. Few state-of-the-art vending machines are enabled with a provision to wirelessly connect with a user device and the user device is communicatively coupled to a system through a network. Here, the system is usually configured to perform auto-pairing of the user device with the vending machine terminal by scanning a QR-code or any other barcode displayed on the vending machine. Once the QR-code is scanned by the user device, the user device displays a product list which is transmitted by the vending machine. The product list is displayed on the user device through wireless communications. Several other methods are also used to transmit the product lists to the user device like displaying the product lists after decoding a string, received from the vending machine's processor. The string includes current inventory information of the vending machine. Further, based upon the decoded string, the user device is configured to populate the product list, stored in the vending machine, for selection of product(s) by the user. After selecting the product(s), the user proceeds for payment. On a successful payment, the user device receives information (usually a code) of dispensing the corresponding product(s) for which successful payment has been done. The user device then provides the same information (code) to the vending machine which then decodes vending data present in the code and enables the dispensing of product(s) from the vending machine.

However, the above process flow works only when the user device has a preinstalled mobile application corresponding to the vending machine before scanning the QR code. If the mobile application is not preinstalled, then user is first prompted to install the mobile application corresponding to the vending machine, after scanning the QR code. Moreover, each different type of vending machine has a different mobile application, depending on the manufacturer of the vending machine. As a result, every time a user visits a new type of vending machine, the user needs to install a new mobile application to gain access to the new vending machine. Hence, presently available technologies, for interaction between the user device and the vending machine, involves installation of a mobile application for different types of user devices and different types of vending machines. It is inconvenient to install dedicated applications for each vending machine to interact with. Further, interacting through the dedicated vending machine application for product dispensation, also incurs problem for proximity verification of the user for dispensing product, specifically in case when multiple users are trying to access the same vending machine at same time. In some instances, this can also be a security concern.

Therefore, there is a long-felt need for quick and automated product dispensation from the self-service kiosks without installing an application corresponding to the self-service kiosks.

SUMMARY

This summary is provided to introduce concepts related to wireless product dispensation from a self-service kiosk/vending machine, and the concepts are further described below in the detailed description. This summary is not intended to identify essential features of the claimed subject matter nor is it intended for use in determining or limiting the scope of the claimed subject matter.

The invention describes a system and method related to wireless dispensation of products from the self-service kiosk/vending machine without using an application associated with the self-service kiosk/vending machine, is disclosed. In one embodiment of the present disclosure, a self-service kiosk is disclosed wherein the self-service kiosk comprising a memory and a processing unit coupled to the memory, wherein the processing unit is configured to execute programmed instructions stored in the memory. The processing unit may be configured to execute programmed instructions stored in the memory unit for activating a short-range communication unit while starting up of the self-service kiosk. The short-range communication unit may be configured for receiving a short-range connection request from a user device. Further, the user device may be an iOS operating system enabled portable electronic device. The user device may be configured to generate the short-range connection request upon scanning of a machine-readable code associated with the self-service kiosk. The processing unit may further be configured to execute programmed instructions stored in the memory unit for establishing a short-range connection with the user device in response to the short-range connection request, wherein the short-range connection is established by creating a thin layer of communication using an iOS BLE manager and iOS WebKit interaction applications, wherein the thin layer of communication corresponds to an App clip supported by the user device. The processing unit may further be configured to execute programmed instructions stored in the memory unit for transmitting inventory data to the user device, wherein the user device is configured to display the inventory data, wherein the user device is configured to enable a user to select one or more products from the inventory data. The processing unit may further be configured to execute programmed instructions stored in the memory unit for receiving a product selection data, corresponding to the one or more products, from the user device. The processing unit further be configured to execute programmed instructions stored in the memory unit for dispensing the one or more products from a product dispensing unit based on completion of payment corresponding to the one or more products.

In another embodiment of the present disclosure, a method for dispensing products from a self-service kiosk is disclosed. The method comprising step of activating a short-range communication unit, wherein the short-range communication unit is configured for receiving a short-range connection request from a user device, wherein the user device is an iOS operating system enabled portable electronic device, wherein the user device is configured to generate the short-range connection request upon scanning of a machine-readable code associated with the self-service kiosk. The method may further comprise the step of establishing a short-range connection with the user device in response to the short-range connection request, wherein the short-range connection is established by creating a thin layer of communication using an iOS BLE manager and iOS WebKit interaction applications, wherein the thin layer of communication corresponds to an App clip supported by the user device. The method may further comprise step of transmitting inventory data to the user device, wherein the user device is configured to display the inventory data, wherein the user device is configured to enable a user to select one or more products from the inventory data. The method may further comprise step of receiving a product selection data, corresponding to the one or more products, from the user device. Further, the method may comprise step of dispensing the one or more products from a product dispensing unit based on completion of payment corresponding to the one or more products.

BRIEF DESCRIPTION OF DRAWINGS

The detailed description is described with reference to the accompanying Figures. The same numbers are used throughout the drawings to refer like features and components.

DETAILED DESCRIPTION

Reference throughout the specification to "various embodiments," "some embodiments," "one embodiment," or "an embodiment" means that a particular feature, structure, or characteristic described in connection with the embodiment is included in at least one embodiment. Thus, appearances of the phrases "in various embodiments," "in some embodiments," "in one embodiment," or "in an embodiment" in places throughout the specification are not necessarily all referring to the same embodiment. Furthermore, the particular features, structures or characteristics may be combined in any suitable manner in one or more embodiments. Following is an example which is illustrative only and invention accommodates any and every variation of the example provided below that shall serve the same purpose and is obvious to a person skilled in the art.

The words "comprising," "having," "containing," and "including," and other forms thereof, are intended to be equivalent in meaning and be open ended in that an item or items following any one of these words is not meant to be an exhaustive listing of such item or items or meant to be limited to only the listed item or items. It must also be noted that, the singular forms "a," "an," and "the" include plural references unless the context clearly dictates otherwise. Although any methods similar or equivalent to those described herein can be used in the practice or testing of embodiments of the present disclosure, the exemplary methods are described. The disclosed embodiments are merely exemplary of the disclosure, which may be embodied in various forms.

Figure 1:
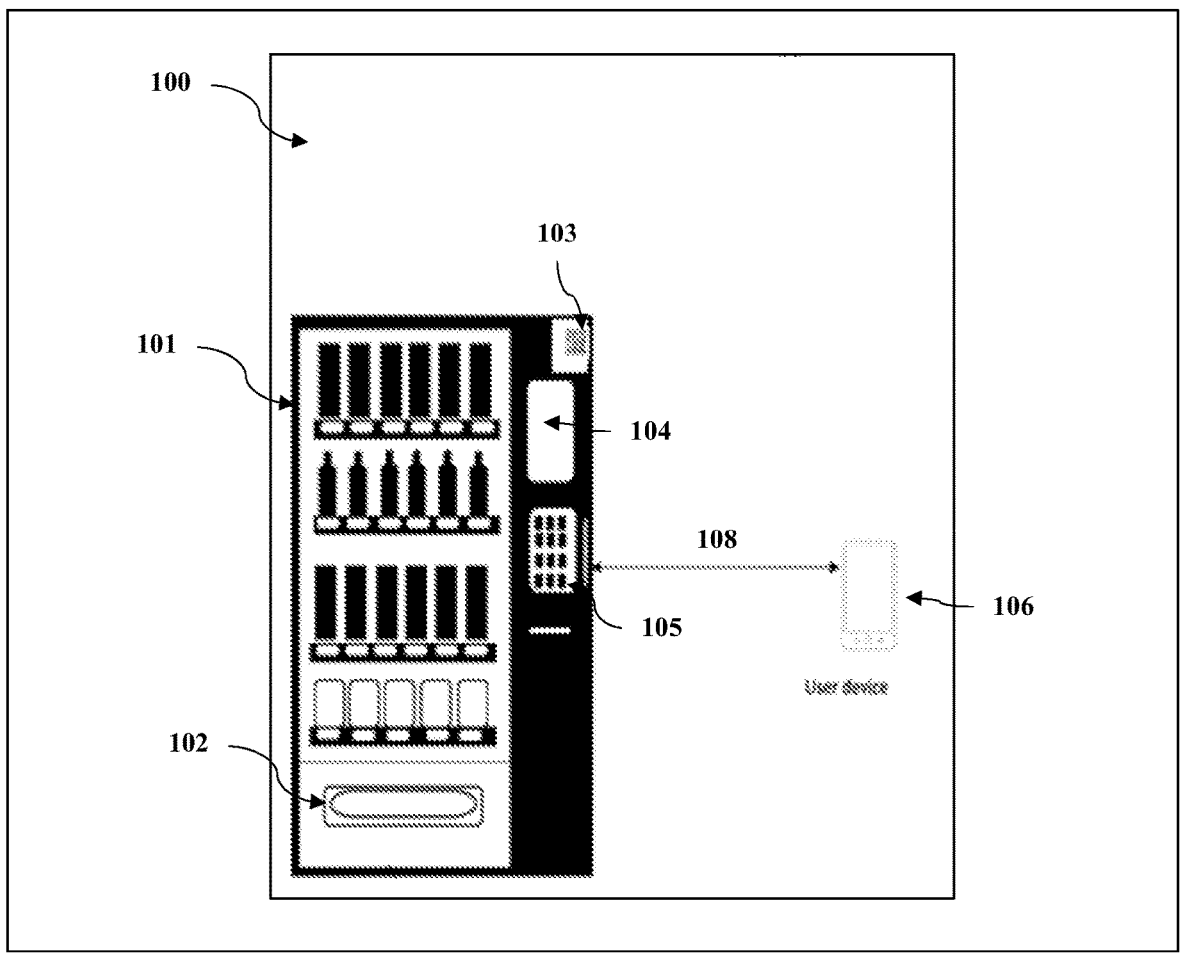
FIG. 1 illustrates a schematic diagram 100 for wireless product dispensation from a self-service kiosk/vending machine, in accordance with an embodiment of the present disclosure.

Referring to FIG. 1, the schematic diagram 100 of a self-service kiosk 101 connected to a user device 106 is illustrated in accordance with an embodiment of the present invention. The self-service kiosk 101 may comprising a product dispensing unit 102, a machine-readable code 103, a display screen 104 and an input interface 105. The self-service kiosk 101 may further comprise one or more non-illustrated components such as a money receiving unit, machine-readable code scanner, a short-range communication unit, a memory unit and a processing unit coupled to the memory unit, wherein the processing unit is configured to execute programmed instructions stored in the memory. The self-service kiosk 101 may comprise any one of the following fountain or post-mix beverage dispenser, a vending machine, a food dispenser, an ATM, a point-of-sale device, or other unmanned electronic device with which a consumer may desire to personalize interaction. The self-service kiosk 101 may disposed on public facilities such as airport, railway stations, shopping malls, community halls or the like.

The short-range communication unit may be activated when the self-service kiosk 101 is powered on. The short-range communication unit may comprise near-field communication (NFC) unit, Bluetooth unit, Bluetooth Low Energy (BLE) enabled device and the like.

The product dispensing unit 102 may be a place where the self-service kiosk 101 may dispose-off the product for customer after completion of a purchase transaction by the customer.

The machine-readable code 103 either may physically be disposed on the self-service kiosk 101 (as illustrated) or may be displayed on a portion of the display screen 104. The machine-readable code 103 may be displayed on a second display screen (not illustrated) different from the display screen 104. The machine-readable code may comprise one of the following: a linear bar code, a Quick Response (QR) code, an optical label or the like. The machine-readable code 103 may contain information related to short-range communication of the self-service kiosk with the one or more user device 106.

The input interface 105 in one embodiment, may correspond to a physical interface for providing user input to the self-service kiosk 101. The physical interface may comprise one or more physical switch or button, pressing of the same may provide input to the self-service kiosk 101. The input interface 105 in another embodiment, may correspond to a touch screen interface for providing user input to the self-service kiosk 101.

The user device 106 may comprise a variety of portable electronic device, including but not limited to cellular device, mobile device, tablets, portable digital assistants (PDAs), laptop computers, netbooks, smart books, MP3 players such as I-PODS and the like, other telecommunications devices, other data processing devices, and the like. The user device 106 may correspond to an operating system enabled electronic device. The operating system may not support browser based BLE connection. For example, user device 106 may correspond to an iOS operating system enabled portable electronic device. The user device 106 may comprise one or more optical sensor for ex. Camera for scanning machine-readable code 103. In one embodiment, scanning a machine-readable code 103 from an optical sensor of the user device 106 may enables the user device 106 to generate a short-range connect request for the self-service kiosk. The short-range communication unit of the self-service kiosk 101 may receive the short-range connection request generated by the user device 106. The details related to enabling of short-range communication in the user device 106 will be described in FIG. 4.

The money receiving unit may comprise an input interface (different from input interface 105) which enables a user or customer to insert money into the self-service kiosk 101. The money may comprise currency notes, coins, any physical tokens representing money and the like. The machine-readable code scanner may comprise an input interface which enables a user or customer to scan a machine-readable code to provide input to the self-service kiosk 101. The machine-readable code scanner may comprise linear bar code scanner, a Quick Response (QR) code scanner, a radio-frequency identification (RFID) identification device, a near-field communication (NFC) reading device, and the like. In one embodiment the machine-readable code scanner may correspond to a separate unit from the input interface 105. In another embodiment, the user interface 105 may comprise functionalities related to the machine-readable code scanner.

The memory unit in one embodiment may comprise any computer-readable medium known in the art including but not limited to volatile memory, such as static random-access memory (SRAM) and dynamic random-access memory (DRAM), and/or non-volatile memory, such as read-only memory (ROM), erasable programmable ROM, flash memories, hard disks, optical disks, memory cards and cloud storage.

The processing unit is coupled to the memory unit and is configured to execute programmed instructions stored in the memory unit. The processing unit, in one embodiment, may comprise a standard microprocessor, microcontroller, central processing unit (CPU), distributed or cloud processing unit, and/or other processing logic that accommodates the requirements of the present invention.

Figure 2:
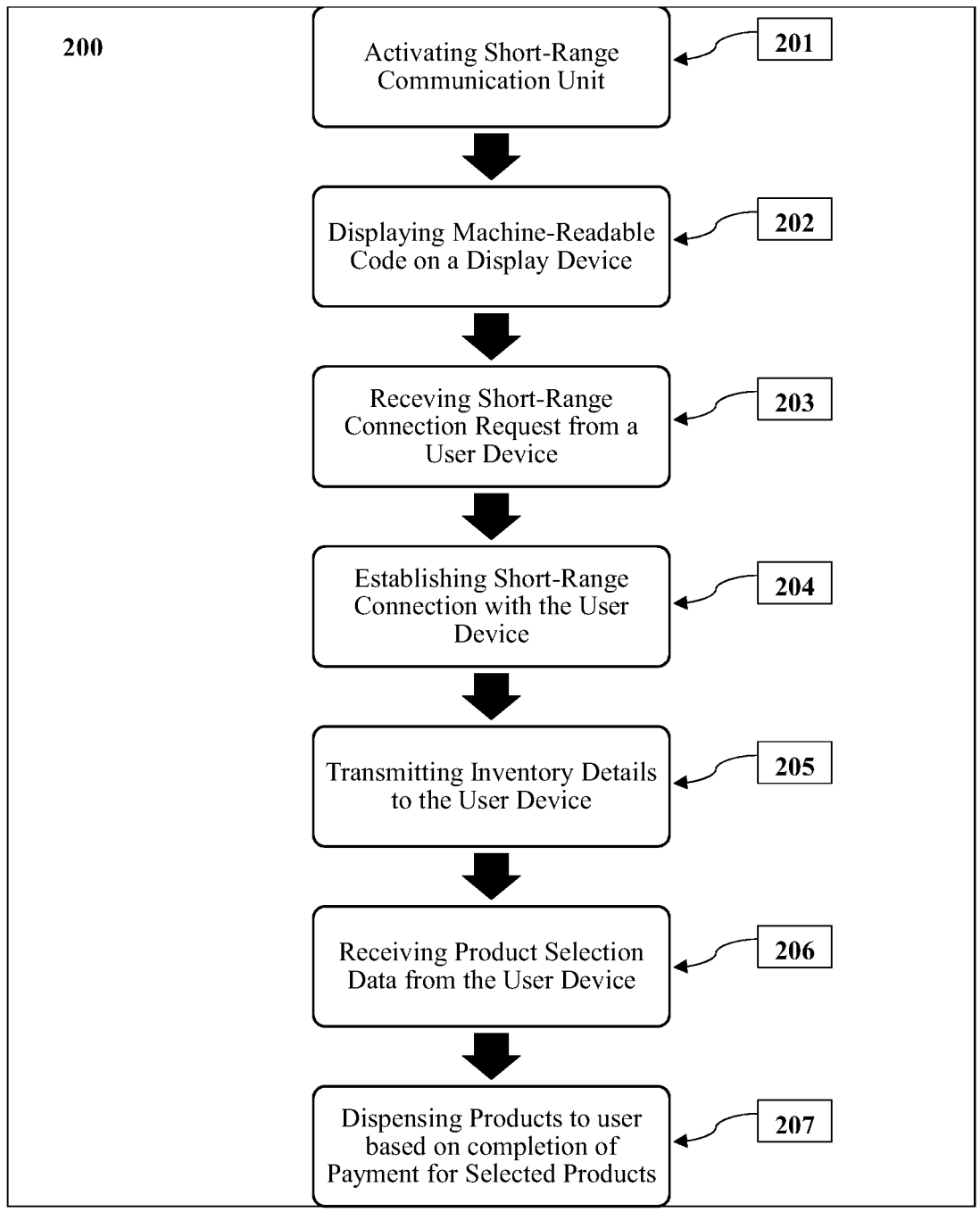
FIG. 2 illustrates a flow diagram 200 representing processing method performed by a self-service kiosk, in accordance with an embodiment of the present disclosure.

Referring to FIG. 2, the flow diagram 200 representing processing method performed by a self-service kiosk 101, is illustrated in accordance with an embodiment of the present invention.

At step 201, the self-service kiosk 101 may activates the short-range communication unit associated with the self-service kiosk 101. The activation of short-range communication unit may be performed on powering on of the self-service kiosk 101. The activation of short-range communication unit enables the self-service kiosk 101 to receive one or more short-range connection requests.

At step 202, the self-service kiosk 101 may display a machine-readable code 103 on a display screen 104.

At step 203, the self-service kiosk 101 may receive a short-range connection request from the user device 106. The receiving step 203 may be performed in response to scanning of the machine-readable code 103 by the user device 106.

At step 204, the self-service kiosk 101 may establish a short-range connection 108 with the user device 106 in response to receiving the short-range connection request. The short-range connection 108 may comprise a Bluetooth Low Energy (BLE) connection.

At step 205, the self-service kiosk 101 may transmits inventory details to the user device 106. The transmission of the inventory details may be performed via the BLE connection established between the self-service kiosk 101 and the user device 106. The inventory details may include current stock of the products available for dispensing in the self-service kiosk 101. The inventory details may contain information including but not limited to product image, price, quantity and more.

At step 206, the self-service kiosk 101 may receive product selection data from the user device 106. The product selection data may comprise information about the products selected by user of the user device 106 for purchase.

Further at step 207, the self-service kiosk 101 may dispense products on the product dispensing unit 102. The products from the self-service kiosk 101 may dispense based on completion of payment for the products selected by the user of the user device 106. The user may make payment for the selected products by using at least one payment technique from one or more payment techniques, including but not limited to Tap and Pay, Digital wallet and the like.

Figure 3:
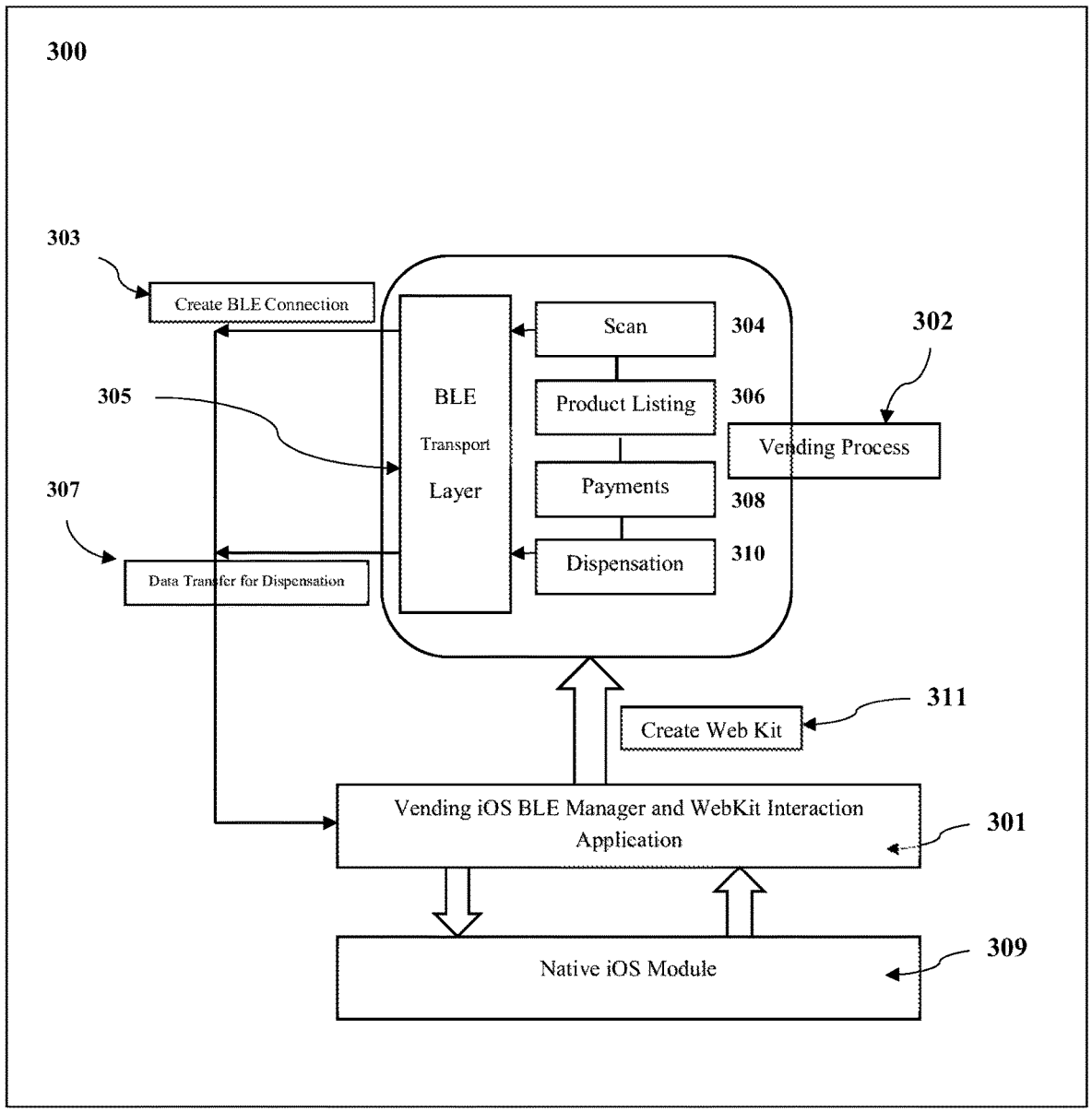
FIG. 3 illustrates a block diagram 300 representing communication of self-service kiosk with iOS operating system enabled portable electronic device, in accordance with an embodiment of the present disclosure.

Referring now to FIG. 3, the block diagram 300 representing communication of self-service kiosk 101 with iOS operating system enabled portable electronic device 106, is illustrated in accordance with an embodiment of the present invention. The iOS operating system enabled portable electronic device 106 may interact with Vending iOS BLE manager and WebKit interaction Application 301 of the self-service kiosk 101. The self-service kiosk for interacting with the iOS enabled portable electronic device 106 may comprise a vending process 302 which enables the self-service kiosk 101 to perform processing steps 304, 306, 308 and 310. On start-up of the self-service kiosk 101, a machine-readable code 103 may be displayed on the display device 104 associated with the self-service kiosk 101. Based on the Scan vending process 304, an optical sensor (i.e., Camera) associated with iOS operating system enabled portable electronic device 106 may scans the machine-readable code 103 displayed on the display device 104. On scanning of the machine-readable code 103, the vending process 302 may generate a Bluetooth Low Energy (BLE) transport layer 305 between the self-service kiosk 101 and the Vending iOS BLE manager and WebKit interaction Application 301. The details related to enabling of short-range communication in the user device 106, which leads to generating a BLE transport layer 305, will be described in FIG. 4. Further the vending iOS BLE manager and WebKit interaction Application 301 in turn creates a BLE connection with the Native iOS module 309 of the iOS operating system enabled portable electronic device 106. The vending iOS BLE manager and WebKit interaction Application 301 may create WebKit 311 browser engine for enabling the communication between the self-service kiosk 101 and iOS enabled portable electronic device 106. Thus, a BLE connection is established between the self-service kiosk 101 and iOS enabled portable electronic device 106. Further the product listing process 306 enables the self-service kiosk 101 to transmit and display listing of products to the iOS enabled portable electronic device 106. The product lists may be displayed on the App Clips of the iOS enabled portable electronic device 106. Further after getting product selection from the iOS operating system enabled portable electronic device 106, the Payments process 308 enables the self-service kiosk 101 to enable the iOS enabled portable electronic device 106 to make payments for the selected products. After completion of the payments for the selected products, the Dispensation process 310 may enables the self-service kiosk 101 to transfer data for dispensation to the iOS enabled portable electronic device 106.

Figure 4:
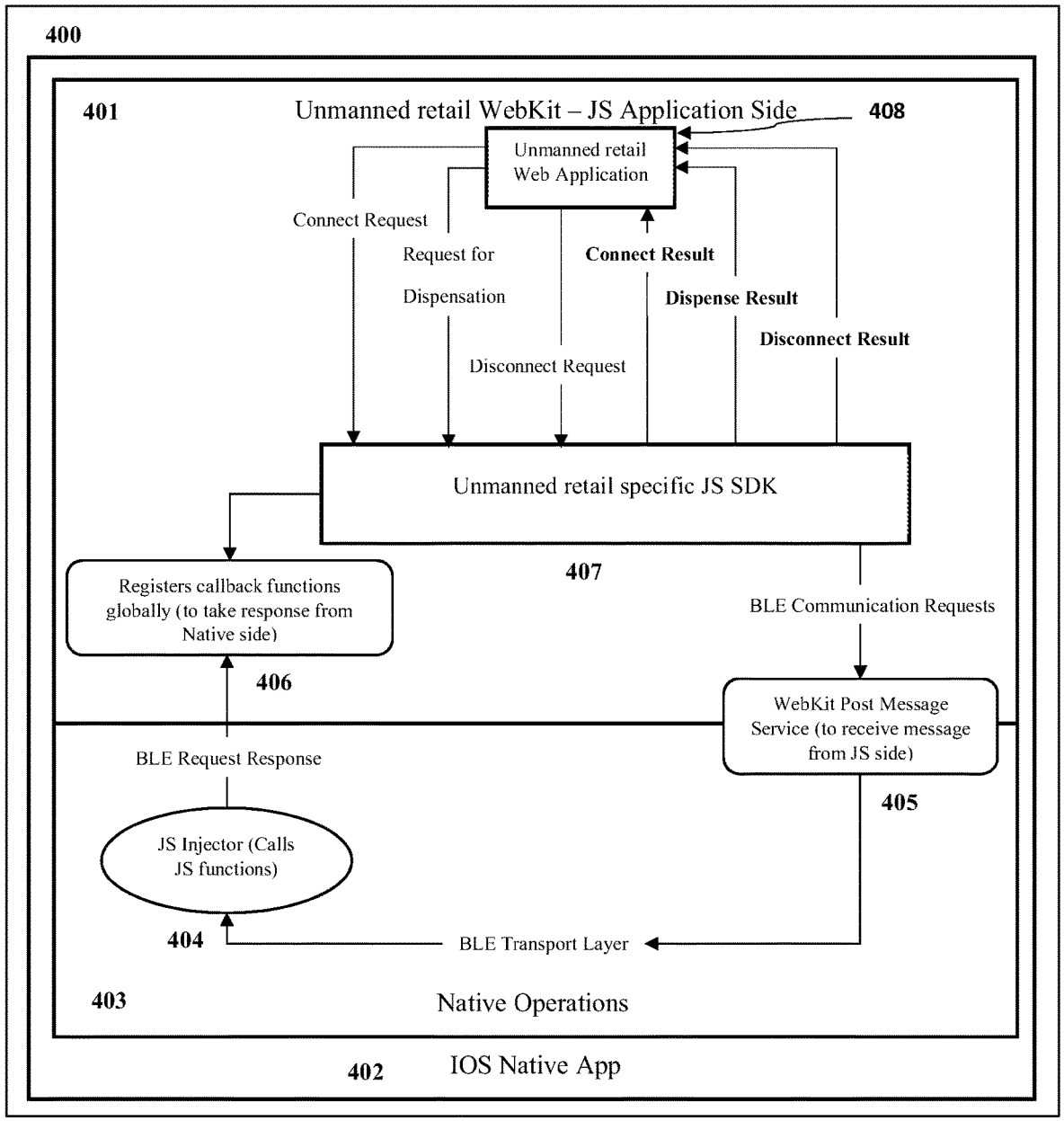
FIG. 4 illustrates a block diagram 400 representing operation flow between Unmanned retail specific JavaScript (JS) Software Development Kit (SDK) and Native App of iOS operating system enabled portable electronic device, in accordance with an embodiment of the present disclosure.

Referring now to FIG. 4, the block diagram 400 representing operation flow between Unmanned retail specific JavaScript (JS) Software Development Kit (SDK) and Native App 402 of iOS operating system enabled portable electronic device 106, is illustrated in accordance with an embodiment of the present invention. The operation flow as illustrated in FIG. 4 is resulting in enabling the short-range communication in the iOS enabled portable electronic device 106. Scanning a machine-readable code 103 from an optical sensor of the iOS enabled portable electronic device 106 may triggers downloading of an Unmanned retail specific JavaScript (JS) Software Development Kit (SDK) WebKit 401 (hereinafter referred to as Unmanned retail WebKit 401) on the iOS enabled portable electronic device 106. The Unmanned retail WebKit 401 is configured to interact with the Native App 402 of the iOS operating system enabled portable electronic device 106, to enable the short-range communication in the iOS enabled portable electronic device 106. The interaction by the Unmanned retail WebKit 401 may triggers performing Native Operations 403 on the Native App 402 of the iOS operating system enabled portable electronic device 106.

The Unmanned retail WebKit 401 may comprises an Unmanned retail Web Application 408 and an Unmanned retail specific JS SDK 407. The unmanned retail Web Application 408 may comprise one or more programmed instructions related to functionalities of the self-service kiosk (or vending machine) 101. The Unmanned retail Web Application 408 may be configured to enable functionalities such as Request/Response of Connection, Disconnection or Dispensation of the iOS enabled portable electronic device 106 and the self-service kiosk 101. Further, the Unmanned retail specific JS SDK 407 may comprise one or more programmed instructions related to implementation details of functionalities of the self-service kiosk 101. The Unmanned retail specific JS SDK 407 may be configured to implement one or more functional or messaging service such as WebKit Post Message Service 405, Register Callback Functions 406 or more. The WebKit Post Message Service 405 may be configured to receive Message/Request from the Unmanned retail JS Side Web Application 408. In another embodiment, the WebKit Post Message Service 405 may be configured to transmit Message/Request from the Unmanned retail JS Side Web Application 408 to perform/enable Native operations on the Native App 402 of the iOS operating system enabled portable electronic device 106. The Register Callback Functions 406 may be configured to register global callback functions to take response from the Native side of the Native App 402 of the iOS operating system enabled portable electronic device 106. In another embodiment, the Register Callback Functions 406 may be configured to receive response from the Native Side and transmits back to the Unmanned retail Web Application 408.

In exemplary embodiment, the Unmanned retail Web Application 408 of the Unmanned retail WebKit 401 at the iOS device 106, may request for a Bluetooth Low Energy (BLE) based short-range communication with a nearby self-service kiosk 101. The BLE connection request may be communicated to the Unmanned retail specific JS SDK 407. The Unmanned retail specific JS SDK 407 may communicate the BLE connection request to the WebKit Post Message Service 405. In response, the WebKit Post Message Service 405 may interact with the Native iOS App to create a BLE Transport Layer (Native Operation 403). After creating the BLE transport layer, the Unmanned retail specific JS SDK 407 may be configured to receive BLE request response from the Native iOS App via the Register Callback Functions 406 service. The Register Callback Functions 406 may receive the BLE request response from the JS Injector 404 placed at the native side of the iOS App. The JS Injector 404 may be configured to call JavaScript functions to inject/transmit response to the Unmanned retail specific JS SDK 407.

The method and system of wireless dispensation of products from the self-service kiosk/vending machine, of the present subject matter offer following advantages, but are not limited to, following benefits/advantages:

Allow customers to quickly perform their checkout process for a self-service kiosk/vending machine Enable customers to purchase products or perform transactions with any self-service kiosk (vending machines from different manufactures/OEMs) without installing corresponding applications on their mobile device.

Ensure disambiguation among the customers in case of multiple customers trying to access the same vending machine at a same time.

Ensure highly secure transactions.

Improve customer experience with the self-service kiosk.

The embodiments, examples and alternatives of the preceding paragraphs or the description and drawings, including any of their various aspects or respective individual features, may be taken independently or in any combination. Features described in connection with one embodiment are applicable to all embodiments, unless such features are incompatible.

Although the implementations for the wireless dispensation of products from the self-service kiosk/vending machine have been described in language specific to structural features and/or methods, it is to be understood that the appended claims are not necessarily limited to the specific features or methods described. Rather, the specific features and methods are disclosed as examples of implementations for wireless dispensation of products from the self-service kiosk/vending machine along with as disclosed components.

The invention claimed is:

1. A self-service kiosk, the self-service kiosk comprising:
a memory;
a processing unit couple to the memory, wherein the processing unit is configured to execute programmed instructions stored in the memory for:
activating a short-range communication unit, wherein the short-range communication unit is configured for receiving a short-range connection request from a user device, wherein the user device is an iOS operating system enabled portable electronic device, wherein the user device is configured to generate the short-range connection request upon scanning of a machine-readable code associated with the self-service kiosk;

establishing a short-range connection with the user device in response to the short-range connection request, wherein the short-range connection is established by creating a thin layer of communication using an iOS BLE manager and iOS WebKit interaction applications, wherein the thin layer of communication corresponds to an App clip supported by the user device;

transmitting inventory data to the user device, wherein the user device is configured to display the inventory data, wherein the user device is configured to enable a user to select one or more products from the inventory data; and receiving a product selection data, corresponding to the one or more products, from the user device.

2. A self-service kiosk as claimed in claim 1, wherein the short-range connection comprises a Bluetooth Low Energy (BLE) connection.

3. A self-service kiosk as claimed in claim 1, wherein the machine-readable code corresponds to a physical machine-readable code associated with the self-service kiosk.

4. A self-service kiosk as claimed in claim 1, wherein the machine-readable code corresponds to a visual representation of the machine-readable code associated with the self-service kiosk, wherein the visual representation is at least one of a digital image of QR code or bar code.

5. A self-service kiosk as claimed in claim 1, wherein the payment for the one or more products is made either using Tap and Pay mechanism or through digital wallet.

6. A self-service kiosk as claimed in claim 1 is further configured for dispensing the one or more products from a product dispensing unit based on completion of payment corresponding to the one or more products.

7. A self-service kiosk as claimed in claim 1, wherein generating the short-range connection request upon scanning of a machine-readable code may comprise downloading an unmanned retail WebKit on the user device and performing Native Operations to create a BLE transport layer on Native App of the user device.

8. A method for dispensing products from a self-service kiosk, the method comprising steps of:

activating a short-range communication unit, wherein the short-range communication unit is configured for receiving a short-range connection request from a user device, wherein the user device is an iOS operating system enabled portable electronic device, wherein the user device is configured to generate the short-range connection request upon scanning of a machine-readable code associated with the self-service kiosk;

establishing a short-range connection with the user device in response to the short-range connection request, wherein the short-range connection is established by creating a thin layer of communication using an iOS BLE manager and iOS WebKit interaction applications, wherein the thin layer of communication corresponds to an App clip supported by the user device;

transmitting inventory data to the user device, wherein the user device is configured to display the inventory data, wherein the user device is configured to enable a user to select one or more products from the inventory data;

receiving a product selection data, corresponding to the one or more products, from the user device; and dispensing the one or more products from a product dispensing unit based on completion of payment corresponding to the one or more products.

9. A method as claimed in claim 8, wherein the short-range connection comprises a Bluetooth Low Energy (BLE) connection.

10. A method as claimed in claim 8, wherein the machine-readable code corresponds to a physical machine-readable code associated with the self-service kiosk.

11. A method as claimed in claim 8, wherein the machine-readable code corresponds to a visual representation of the machine-readable code associated with the self-service kiosk, wherein the visual representation is at least one of a digital image of QR code or bar code.

12. A method as claimed in claim 8, wherein the payment for the one or more products is made either using Tap and Pay mechanism or through digital wallet.

13. A method as claimed in claim 8 further comprises steps for dispensing the one or more products from a product dispensing unit based on completion of payment corresponding to the one or more products.

14. A method as claimed in claim 8, wherein generating the short-range connection request upon scanning of a machine-readable code may comprise downloading an unmanned retail WebKit on the user device and performing Native Operations to create a BLE transport layer on Native App of the user device.

\* \* \* \* \*